(12) United States Patent
Rutherford

(10) Patent No.: US 10,569,618 B2
(45) Date of Patent: Feb. 25, 2020

(54) CAR ROOF AUTOMATIC HVAC APPARATUS

(71) Applicant: Lawrence Rutherford, Dallas, TX (US)

(72) Inventor: Lawrence Rutherford, Dallas, TX (US)

(*) Notice: Subject to any disclaimer, the term of this patent is extended or adjusted under 35 U.S.C. 154(b) by 174 days.

(21) Appl. No.: 15/801,345

(22) Filed: Nov. 2, 2017

(65) Prior Publication Data
US 2019/0126715 A1    May 2, 2019

(51) Int. Cl.
| | | |
|---|---|---|
| *B60H 3/00* | (2006.01) | |
| *B60H 1/00* | (2006.01) | |
| *B62D 25/06* | (2006.01) | |
| *B60H 1/26* | (2006.01) | |
| *B60H 1/24* | (2006.01) | |

(52) U.S. Cl.
CPC ......... *B60H 1/008* (2013.01); *B60H 1/00828* (2013.01); *B60H 1/00978* (2013.01); *B60H 1/245* (2013.01); *B60H 1/262* (2013.01); *B62D 25/06* (2013.01)

(58) Field of Classification Search
CPC ......... B60H 1/00; B60H 1/245; B60H 1/262; B60H 1/008; B60H 1/00828; B60H 1/00978
USPC ... 454/136–138, 141, 143, 156, 69, 84, 129, 454/159–160
See application file for complete search history.

(56) References Cited

U.S. PATENT DOCUMENTS

| | | | |
|---|---|---|---|
| 5,595,239 A | 1/1997 | Wolf et al. | |
| 6,780,097 B2 | 8/2004 | Shuttleworth et al. | |
| 6,808,450 B2 | 10/2004 | Snow | |
| 6,827,642 B2 * | 12/2004 | Flick | B60R 25/00 361/231 |
| 7,334,834 B2 * | 2/2008 | Hill | B60H 1/00378 296/190.09 |
| 7,658,670 B1 * | 2/2010 | Brown | B60H 1/267 454/124 |
| 2002/0130534 A1 * | 9/2002 | Strommer | B60H 1/00464 296/214 |
| 2004/0089007 A1 * | 5/2004 | Umebayashi | B60H 1/247 62/244 |
| 2010/0120345 A1 * | 5/2010 | Ryan | B60H 1/00371 454/75 |
| 2011/0061414 A1 * | 3/2011 | McAllister, II | B60H 1/00371 62/244 |
| 2015/0099443 A1 * | 4/2015 | Hirabayashi | B60H 1/00657 454/75 |

(Continued)

*Primary Examiner* — Vivek K Shirsat

(57) ABSTRACT

A car roof automatic HVAC apparatus disposed within a roof of an automobile to maintain a more comfortable temperature inside of the automobile for a driver to return to, and to act as a safety mechanism to prevent a child or pet left inside the automobile from dying of excessive heat or cold. A plurality of vents has a plurality of fans disposed within, and a heater allows the fans to blow hot air when needed. A first CPU, the heater, a light, the plurality of vents, and the plurality of fans are powered by a rechargeable battery or an alternate power source. A remote control can be used to operate the car roof automatic HVAC apparatus. An automobile interface unit disposed within the automobile can detect when the vehicle has been turned off for a programmed amount of time to automatically begin ventilation or heating.

1 Claim, 4 Drawing Sheets

(56) References Cited

U.S. PATENT DOCUMENTS

2018/0208016 A1\* 7/2018 O'Brien ............ B60H 1/00207
2019/0168573 A1\* 6/2019 O'Brien ............ B60H 1/00207

\* cited by examiner

CAR ROOF AUTOMATIC HVAC APPARATUS

BACKGROUND OF THE INVENTION

Various types of car HVAC units are known in the prior art. Most existing units are large, roof mounted units designed primarily for vans and campers. They are unsightly, and would look even more so on a normal passenger car. Air conditioning is often the primary function, and the units are intended for use while the vehicle is occupied, not unattended. What is needed, and what the present car roof automatic HVAC apparatus provides, is a more streamlined device that can be integrated into the roof of a normal vehicle to maintain the temperature inside the vehicle at a comfortable and safe level when left unattended, especially when a pet or child is left inside.

FIELD OF THE INVENTION

The present invention relates to vehicle HVAC units, and more particularly, to a car roof automatic HVAC apparatus.

SUMMARY OF THE INVENTION

The general purpose of the present car roof automatic HVAC apparatus, described subsequently in greater detail, is to provide a car roof automatic HVAC apparatus that has many novel features that result in a car roof automatic HVAC apparatus that is not anticipated, rendered obvious, suggested, or even implied by prior art, either alone or in combination thereof.

To accomplish this, the present car roof automatic HVAC apparatus includes a rectangular unit body having a driver side and a passenger side disposed within a roof of an automobile. The unit body is configured to occupy the entirety of the roof, with the exception of a sunroof if present. The unit body has a thickness equal to a second thickness of the roof, and thus does not interfere with the aesthetic of an exterior of the automobile. A plurality of vents is disposed within the unit body. In one embodiment of the invention, the plurality of vents has a first open position and a second closed position. When the plurality of vents is in the second closed position, it matches an interior of the roof. A light is centrally disposed on the plurality of vents. A plurality of fans is disposed within the vents, wherein each of the plurality of fans has a perimeter. A heater disposed within the unit body has a heater coil disposed on the perimeter of each of the plurality of fans, allowing the fans to blow hot air into the automobile to keep it warm. When the external temperature is hot, the heater remains off and the fans circulate air into the vehicle. A first CPU is disposed within the unit body. A rechargeable battery disposed within the driver side of the unit body is in operational communication with the first CPU, the heater, the light, the plurality of vents, and the plurality of fans. An alternate power source is disposed within the unit body, wherein the alternate power source is in operational communication with each of the rechargeable battery, the first CPU, the heater, the light, the plurality of vents, and the plurality of fans. The alternate power source is configured to provide power to the first CPU, the heater, the light, the plurality of vents, and the plurality of fans when the rechargeable battery is depleted. The alternate power source can be, but is not limited to, a solar powered generator. A receiver chip is also disposed within the unit body, wherein the receiver chip is in operational communication with the first CPU. A remote control having a battery, a second CPU, a first transmitter, and a plurality of control buttons can be used to operate the car roof automatic HVAC apparatus. An automobile interface unit disposed within the automobile has a timer, a third CPU, and a second transmitter, wherein each of the timer and the second transmitter is in operational communication with the third CPU. The third CPU is in operational communication with an ignition switch of the automobile. The automobile interface unit can detect when the vehicle has been turned off for a programmed amount of time to automatically begin ventilation or heating. Beyond maintaining a more comfortable temperature inside of the automobile for a driver to return to, the car roof automatic HVAC apparatus acts as a safety mechanism to prevent a child or pet left inside the automobile from dying of excessive heat or cold.

Thus have been broadly outlined the more important features of the present car roof automatic HVAC apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
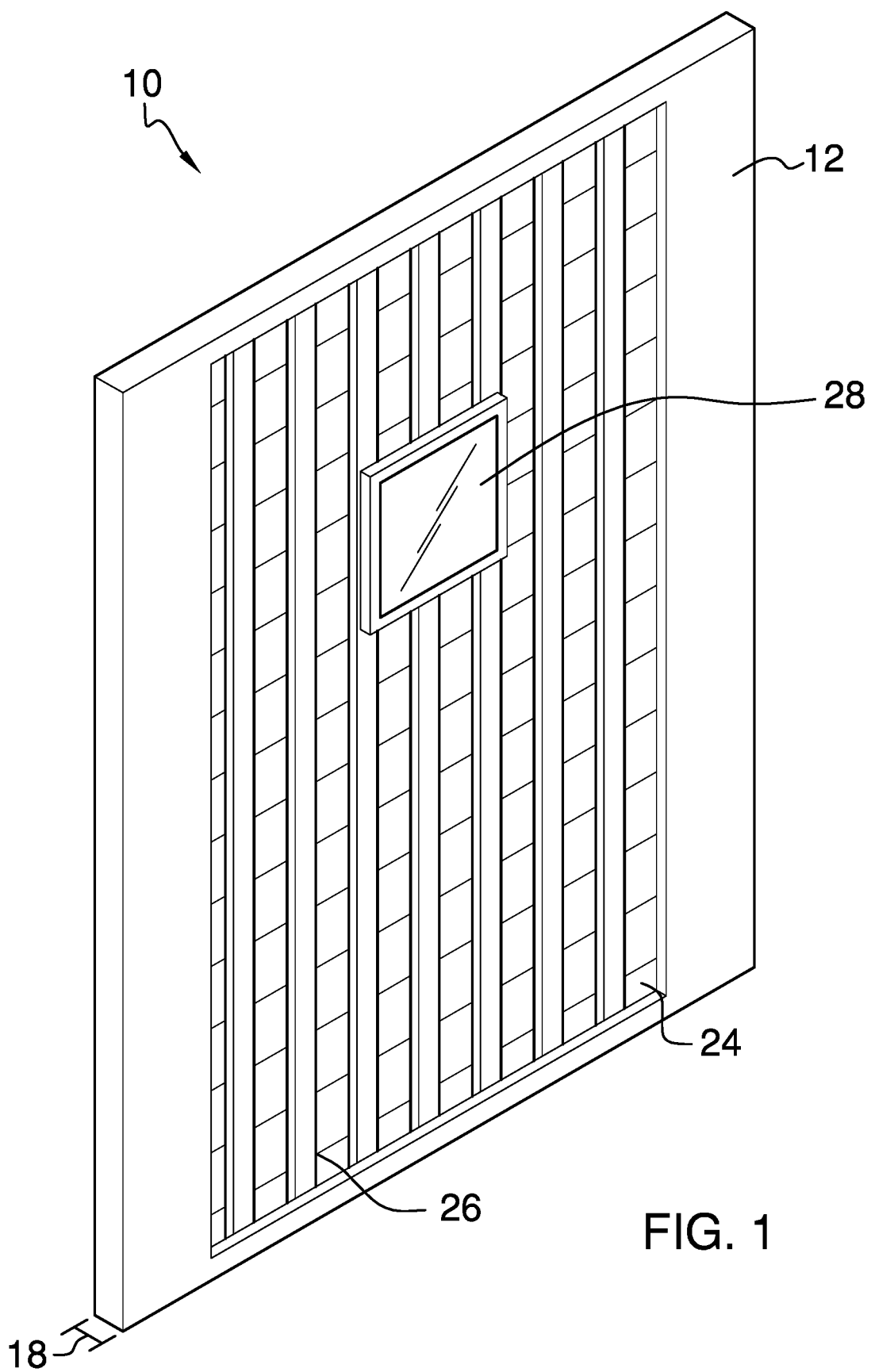
FIG. 1 is an isometric view of a car roof automatic HVAC apparatus.
Figure 2:
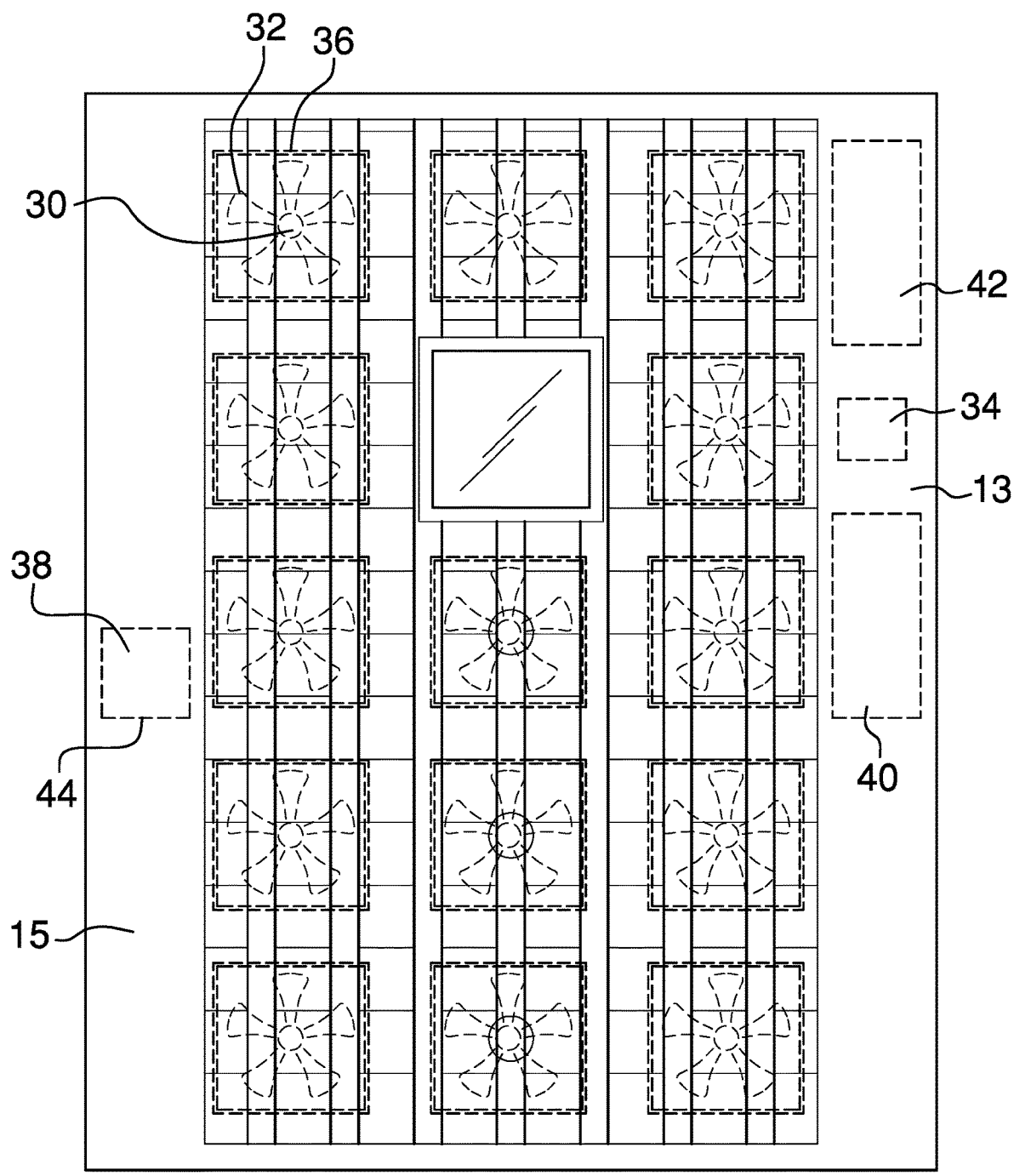
FIG. 2 is top plan view of the car roof automatic HVAC apparatus.
Figure 3:
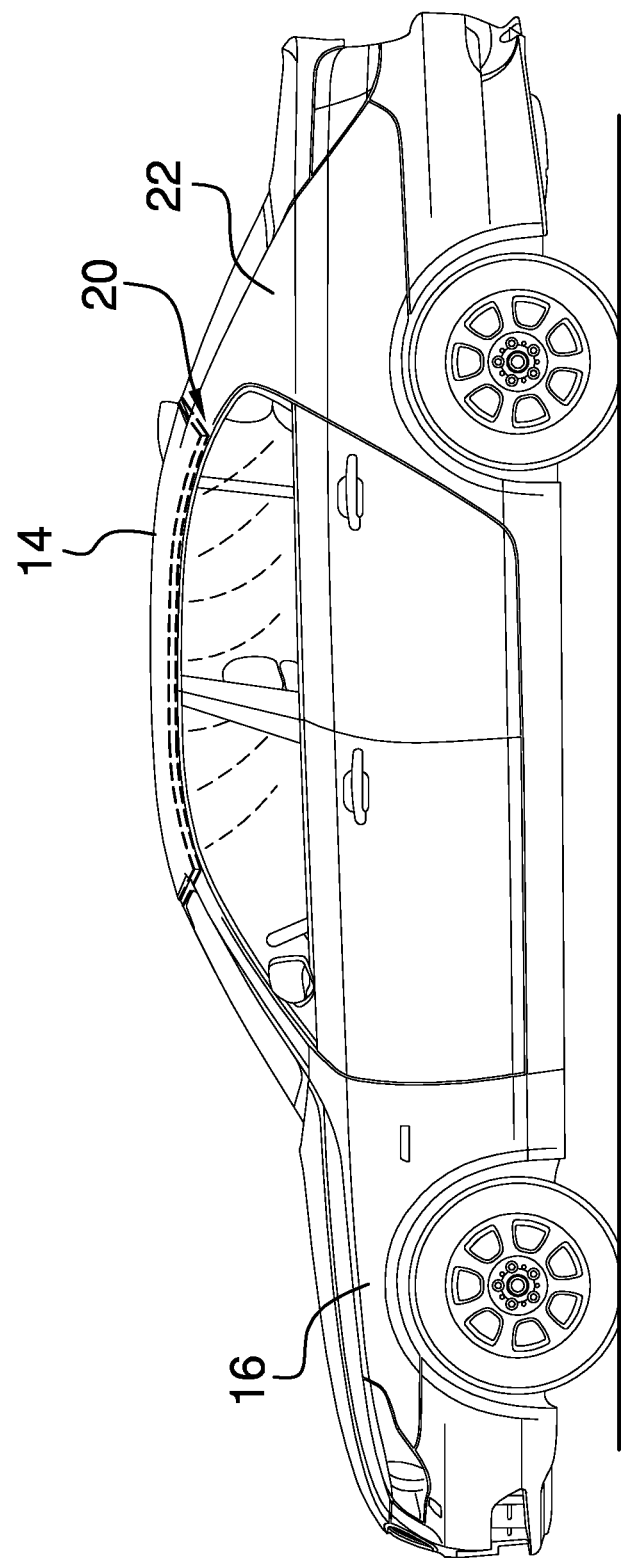
FIG. 3 is an in-use side elevation view of the car roof automatic HVAC apparatus installed in an automobile.
Figure 4:
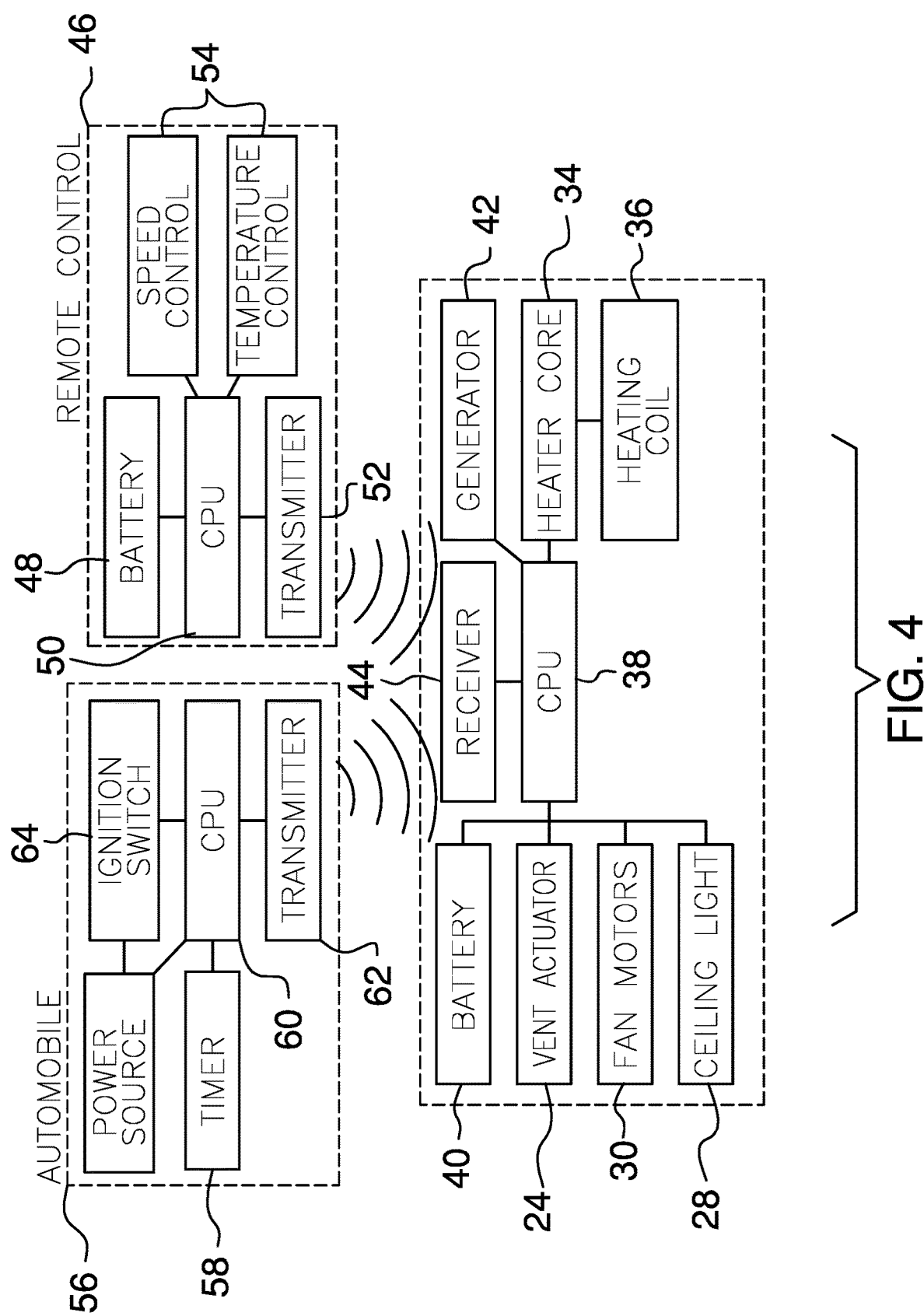
FIG. 4 is a block diagram of the car roof automatic HVAC apparatus.

With reference now to the drawings, and in particular FIGS. 1 through 4 thereof, an example of the instant car roof automatic HVAC apparatus employing the principles and concepts of the present car roof automatic HVAC apparatus and generally designated by the reference number 10 will be described.

Referring to FIGS. 1 through 4 the present car roof automatic HVAC apparatus 10 is illustrated. The car roof automatic HVAC apparatus 10 includes a rectangular unit body 12 having a driver side 13 and a passenger side 15 disposed within a roof 14 of an automobile 16. The unit body 12 has a thickness 18 equal to a second thickness 20 of the roof 14, and thus does not interfere with the aesthetic of an exterior 22 of the automobile. A plurality of vents 24 is disposed within the unit body 12. In one embodiment of the invention, the plurality of vents has a first open position 26 and a second closed position. A light 28 is centrally disposed on the plurality of vents 24. A plurality of fans 30 is disposed within the vents, wherein each of the plurality of fans has a perimeter 32. A heater 34 disposed within the unit body has a heater coil 36 disposed on the perimeter 32 of each of the plurality of fans. A first CPU 38 is disposed within the unit body. A rechargeable battery 40 disposed within the driver side 13 of the unit body is in operational communication with the first CPU 38, the heater 34, the light 28, the plurality of vents 26, and the plurality of fans 30. An alternate power source 42 is disposed within the unit body, wherein the alternate power source is in operational communication with each of the rechargeable battery, the first CPU, the heater, light, the plurality of vents, and the plurality of fans. A receiver chip 44 is also disposed within the unit body, wherein the receiver chip is in operational communication with the first CPU 38. A remote control 46 having a battery 48, a second CPU 50, a first transmitter 52, and a plurality of control buttons 54 can be used to operate the car roof automatic HVAC apparatus 10. An automobile interface unit 56 disposed within the automobile 16 has a timer 58, a third CPU 60, and a second transmitter 62, wherein each of the timer and the second transmitter is in operational communication with the third CPU. The third CPU is in operational communication with an ignition switch 64 of the automobile.

What is claimed is:

1. A car roof automatic HVAC apparatus comprising:
   a rectangular unit body having a driver side and a passenger side, wherein the unit body is disposed within a roof of an automobile, wherein the unit body is configured to occupy the entirety of the roof;
   a plurality of vents disposed within the unit body;
   a plurality of fans disposed within the vents, wherein each of the plurality of fans has a perimeter;
   a light disposed among the plurality of vents and along the central axis of the unit body;
   a heater disposed within the unit body, wherein the heater has a heater coil disposed on the perimeter of each of the plurality of fans;
   a first CPU disposed within the unit body;
   a rechargeable battery disposed within the driver side of the unit body, wherein the rechargeable battery is in operational communication with the first CPU, the heater, the light, the plurality of vents, and the plurality of fans;
   an alternate power source disposed within the unit body, wherein the alternate power source is in operational communication with each of the rechargeable battery, the first CPU, the heater, the light, the plurality of vents, and the plurality of fans;
   a receiver chip disposed within the unit body, wherein the receiver chip is in operational communication with the first CPU;
   a remote control having a battery, a second CPU, a first transmitter, and a plurality of control buttons; and
   an automobile interface unit disposed within the automobile, wherein the automobile interface unit has a timer, a third CPU, and a second transmitter, wherein each of the timer and the second transmitter is in operational communication with the third CPU, wherein the third CPU is in operational communication with an ignition switch of the automobile.

* * * * *